(12) United States Patent
Hardwick et al.

(10) Patent No.: US 7,746,320 B2
(45) Date of Patent: Jun. 29, 2010

(54) HAPTICS TRANSMISSION SYSTEMS

(75) Inventors: Andrew J Hardwick, Ipswich (GB);
Stephen M Furner, Ipswich (GB)

(73) Assignee: British Telecommunications public limited company, London (GB)

( * ) Notice: Subject to any disclaimer, the term of this patent is extended or adjusted under 35 U.S.C. 154(b) by 989 days.

(21) Appl. No.: 10/571,780

(22) PCT Filed: Sep. 22, 2004

(86) PCT No.: PCT/GB2004/004033

§ 371 (c)(1),
(2), (4) Date: Mar. 15, 2006

(87) PCT Pub. No.: WO2005/032070

PCT Pub. Date: Apr. 7, 2005

(65) Prior Publication Data

US 2008/0231594 A1 Sep. 25, 2008

(30) Foreign Application Priority Data

Sep. 25, 2003 (GB) ................................. 0322489.6

(51) Int. Cl.
*G09G 5/00* (2006.01)

(52) U.S. Cl. ..................... 345/156; 715/701; 715/702; 345/158; 345/163; 345/169; 345/184

(58) Field of Classification Search ........... 345/156–58, 345/161, 163, 167–69, 184; 463/30, 33, 463/36–42; 715/701, 702
See application file for complete search history.

(56) References Cited

U.S. PATENT DOCUMENTS

| 5,734,373 | A | * | 3/1998 | Rosenberg et al. | .......... 345/161 |
| 5,739,811 | A | * | 4/1998 | Rosenberg et al. | .......... 345/161 |
| 6,278,439 | B1 | | 8/2001 | Rosenberg et al. | |
| 6,411,276 | B1 | * | 6/2002 | Braun et al. | ................. 345/156 |
| 7,202,851 | B2 | * | 4/2007 | Cunningham et al. | ....... 345/156 |
| 7,446,752 | B2 | * | 11/2008 | Goldenberg et al. | ........ 345/156 |

FOREIGN PATENT DOCUMENTS

EP          0 875 819        11/1998

* cited by examiner

*Primary Examiner*—Richard Hjerpe
*Assistant Examiner*—Jeffrey Steinberg
(74) *Attorney, Agent, or Firm*—Nixon & Vanderhye P.C.

(57) ABSTRACT

A method of compensating for network latency in haptics transmission in which the position of a haptic effector is controlled by signals received from a network. The method comprises storing a series of locations of the haptic effector, determining from the series using Fourier Transformation or other means frequencies having a growing amplitude and creating a filter function to eliminate the growing frequencies from output signals directing the force and direction of the haptic effector.

17 Claims, 8 Drawing Sheets

Fig 1

Hardware

HAPTICS TRANSMISSION SYSTEMS

BACKGROUND

1. Technical Field of Example Embodiments

The present invention relates to haptics transmission systems and more particularly to a system incorporating improved latency correction and a method of improving latency correction.

The present invention relates to haptic communications and more particularly to improving the response of haptic devices coupled by way of a telecommunications network.

2. Description of Related Art

Tactile output from computers has been used to enhance game playing to provide a 'feel', for example vibration, thus adding an additional sensory perception to the games. Such outputs have also been used to enable visually impaired people to read documents and to feel drawings and the like. The basic operation of haptics output devices has been described in our co-pending European Patent Application No. 01305947.2 which disclosed a method for adapting haptic interface output characteristics to correct for per-person differences in the sense of touch. In a further European patent application no 01307951.2 there is disclosed a method of enabling reading of the Moon alphabet by use of a haptics output device. In the transmission of character sets from computers or data stores to haptics output devices there is unlikely to be any time critical activity dependant upon the output signals. However, where game play is involved, particularly if players are competing against each other or against the machine in a competitive manner, transmission delays of forward or reverse force parameters may have a significant impact on the sensed experience.

As game play is more likely to be carried out over a connectionless network, for example the internet or world wide web, rather than by a point to point communications link, signal latency may be introduced which can result in an inconsistency in the sensed movement of the output compared with the input.

Furthermore, sensory devices require frequent updates in both signal directions if the feel of the sensed movement and reaction to users response is to be realistic. The number of updates required to maintain realism, while not a problem where the haptic output device is in close proximity and direct connection to the generating processor, may result in the communications network overloading in a very short time and/or may require extreme allocations of bandwidth.

BRIEF SUMMARY OF EXAMPLE EMBODIMENTS

According to one aspect of the present invention there is provided a method of activating a haptic output device of the kind responsive to signals defining directional force comprising receiving a series of signals defining a multiplicity of data packets, each packet defining a directional force applied at one location for transmission to the current location, determining from packet data the information defining a position to which a haptic output device is expected to move, using current positional data to generate output signals defining force and direction, applying a damping factor to said force and direction signals to slow the rate of movement from a previously defined position towards the current defined position, storing data defining each of a multiplicity of positions to which the haptic output device has moved, analysing said data to determine frequency components in the movement which are increasing, creating a filter function to remove said growing frequency components and applying said filter function to said force and direction signals to eliminate said frequency components from movement effected by the haptic output device.

Preferably the method includes signalling in each direction whereby haptic forces applied at one device in reaction to an applied force towards the current defined position are reflected to a corresponding device in the form of current positional signals in a series of return data packets.

A feature of the present invention provides an interactive haptic output terminal in combination with a bi-directional transmission arrangement, the terminal comprising at least a haptic output device and control means, said control means receiving signals from said haptic output device to determine a current position for said device, and to determine from signals received from said transmission arrangement a preferred current position for said haptic output device, said control mean determining an output force and direction required to move said haptic output device from the current position to the preferred position, further modifying said output force and direction using a damping factor to slow apparent movement between the positions and outputting signals defining the modified force and direction, maintaining a record of data defining each of a multiplicity of positions to which the haptic output device has moved, analysing said data to determine frequency components in the movement which are increasing, creating a filter function to remove said growing frequency components and applying said filter function to said force and direction signals to eliminate said frequency components from movement effected by the haptic output device.

The control means will receive signals from the haptic output device containing data defining the position of said device at any particular time and will convert said data to signals for transmission to said bi-directional transmission arrangement at predetermined intervals.

The signals defining a preferred current position may be generated by an environment simulator, for example a programmed computer, or may be generated by a corresponding interactive output terminal at the opposed end of the transmission arrangement.

Where a series of packets defining preferred position are received, each packet defining a directional force applied at one location for transmission to the current location, the control means may include means to determine from packet data the sequence of transmission and re-ordering the data into a numerically correct series, extrapolating from previously received packets an anticipated linear movement to be defined by subsequently received packets and applying output directional force signals corresponding to said anticipated linear movement in respect of any missing data packet.

BRIEF DESCRIPTION OF THE DRAWINGS

A haptics transmission system in accordance with the invention will now be described by way of example only with reference to the accompanying drawings of which.

DETAILED DESCRIPTION OF EXAMPLES EMBODIMENTS

Figure 1:
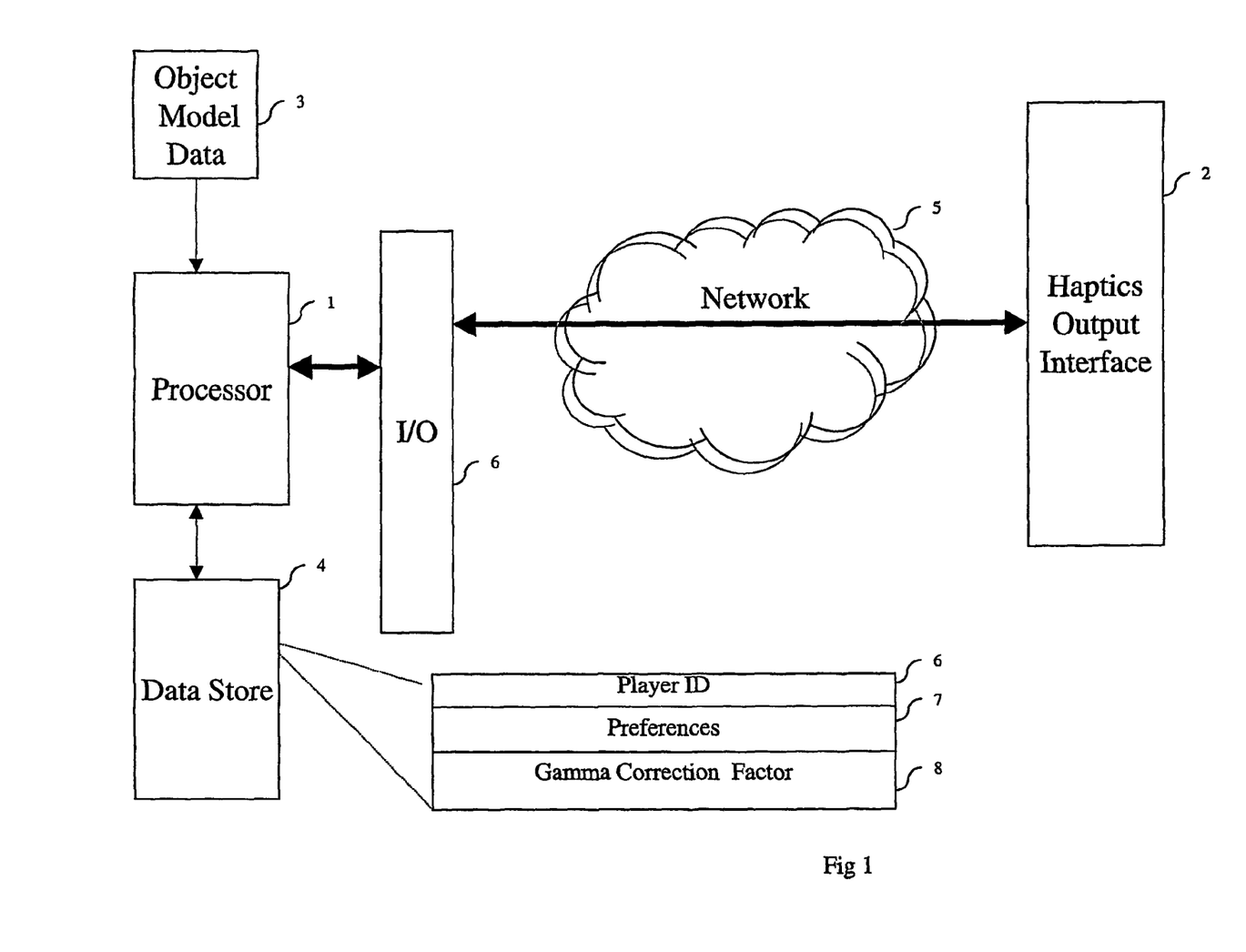
FIG. 1 is a block schematic diagram of a first haptics communications system in which a network interconnects an environmental simulation to a haptics input/output device.

Referring to FIG. 1, in our co-pending European patent application number 01305947.2, there is disclosed a method of providing a haptics output representation of a scene stored, for example, as object model data. In this case a processor 1 includes a program responsive to the position of a haptics output device (for example the Phantom 1.0 Haptic Output device from Sense Able Technologies Inc of the USA), to output reaction the forces based upon the object model data. The object model data stored in a data store 3 could define textures, surfaces and locations of fixed or moveable objects which could be perceived by a user of the haptics output interface 2. In some further developments disclosed in the preceding application information held in a data store 4 based upon a player identity 6 allowed player preferences 7 and a gamma correction factor 8 to be used to provide appropriate output adjustment to ensure that different players have approximately the same perception of the output at the haptics output interface 2.

As disclosed the processor 1 was closely coupled to the haptics output interface 2 and could therefore provide substantially continuous detection of location of the user's finger with respect to the x, y, z axes of the device thus allowing real time simulation of the environment defined by the object model data 3.

As hereinbefore mentioned, once a network 5 is introduced between the haptics output interface 2 and the processor 1 continuous communication of the virtual environment and responsive signalling determining the user's response and location by way of an input/output interface 6 to the processor 1 becomes impractical if one requires to update the signalling at substantially continuous rates. Furthermore, latency introduced to the signalling by the network results in an extremely jerky feel to the information being transmitted.

Figure 2:
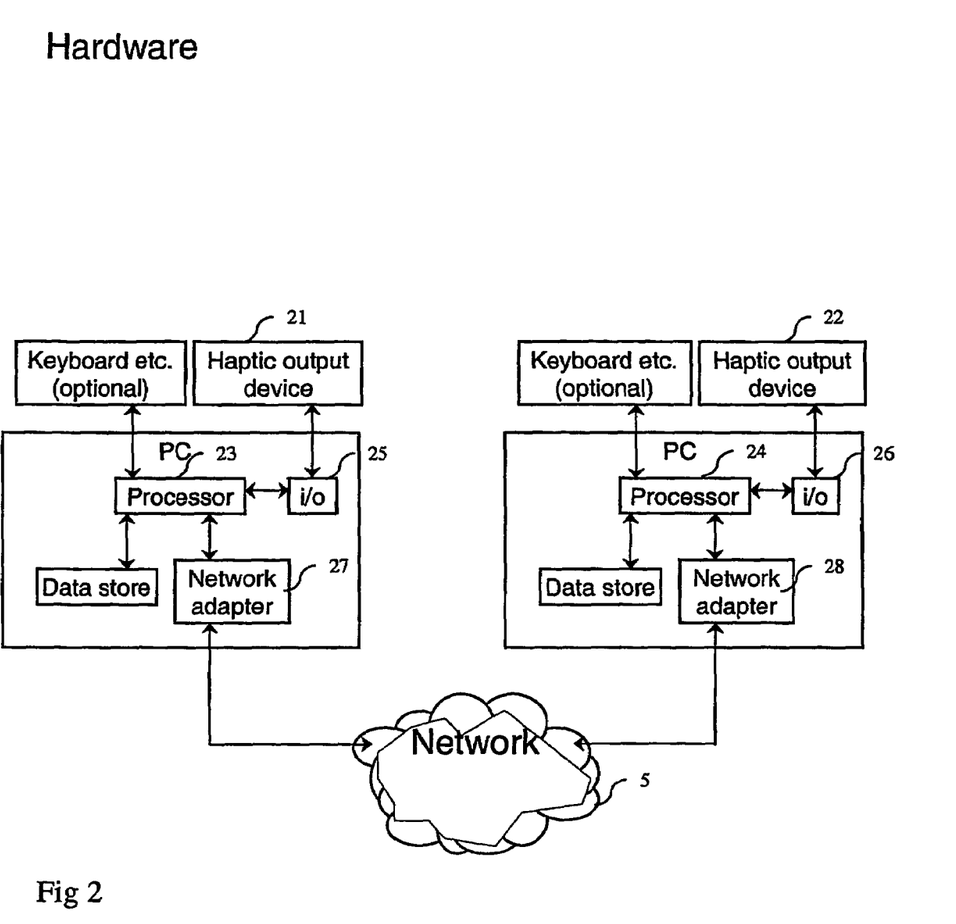
FIG. 2 is a block schematic diagram of a haptics communications system having a plurality of interconnected haptics input/output devices.

Turning now to FIG. 2, where a plurality of haptic output devices 21, 22 are communicating by way of respective input/output interfaces 25, 26 to respective processors 23, 24 the problems of network latency and signalling limitations become more acute. Thus, if the processor 23 receives by way of a network adaptor 27 signals indicating a position for the haptic output device 22 and instantly seeks to move the haptic device 21 to that position accordingly a substantial jerk in the movement will be apparent. In any event, the user of the haptic output device 21 will be applying a backward force which may inhibit such movement and therefore prevent the processor 23 from aligning the position of the haptic output device 21 with that of the haptic output device 22. Correspondingly, the processor 23 in measuring the location of the haptic output device 21 will send signals back through the network 5 by way of network adaptor 28 to the processor 24, which will attempt to make a corresponding movement in the haptic output device 22. Thus, because the communication between haptic devices 21 and 22 is no longer of a continuous mode but is receiving and transmitting positional information at intervals the experience of the users will be significantly impaired. In addition, the period of time taken for signals to traverse the network (network latency) will further impair user perception.

Figure 3:
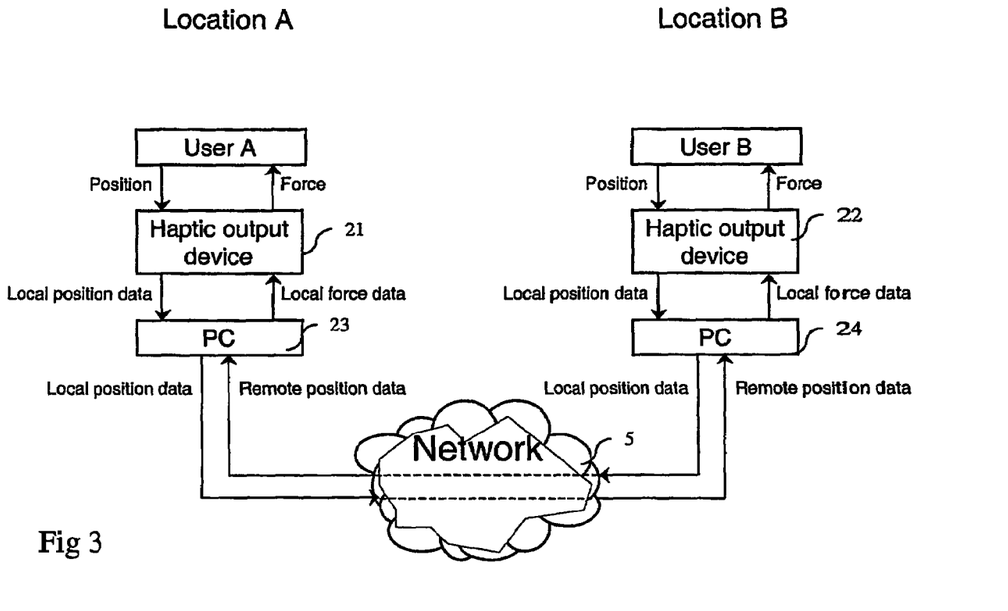
FIG. 3 is a schematic diagram of data interchange within the system of FIG. 2.

Thus considering also FIG. 3, it is possible to perceive that if at a location A a user locates the haptic output device 21 "position" and receives a force from the haptic output device then the local position data derived from "position" is derived by the personal computer (PC) 23 and transmitted to the network. At the same time remote position data received from the network is translated by the PC 23 into local force data. Corresponding position and force derivative data will also be used at location B by the PC 24.

In a practical network the position data and force output are transmitted between each end at approximately five millisecond intervals. Thus each time a new position is received a force is output in an attempt to move the output device to a new position, effectively with a motor pushing against the local user. In effect the user's at each end at positions A and B are coupled together and the two-way activity and data transmission effectively attempts to move both output devices 21 and 22 to corresponding positions. This simulates connection of the two users in a manner such as if they were connected together by some kind of resilience device, for example, a spring or flexible rod. Because there is a reactionary force at each end there can be instability between the two devices because the feed back loop with deferred transmission of forces may result in an effective positive feedback.

Further, network latency can cause instability in systems which transmit haptic information across networks. This instability may manifest itself as a buzzing feeling which reduces quality of service, can damage the haptic output devices and could lead to repetitive strain type injuries. In extreme cases, the instability may result in a catastrophic failure in which the haptic output device goes out of control interrupting use, possibly causing major damage to the output device and in extremis may cause acute injury to the user.

Because touch is an interactive sense, haptic transmissions are more susceptible to feedback problems than audio and visual transmissions which are passive in nature. Observing an object by touch necessarily affects it with a force from the user while the user receives a reaction force from the object. This effectively provides a tightly coupled feedback loop. Because of network latency a delay is introduced in to the feedback loop turning negative feedback into positive feedback at certain frequencies resulting in system instability.

Since the instability has the effect of turning negative feedback into positive feedback at certain frequencies, oscillations at those frequencies grow. The frequencies at which such oscillations occur will vary over time in dependence upon inherent characteristics of the haptic output devices in use but more particularly on the network latency which also varies over time, particularly where connectionless networking is employed.

Accordingly, the invention seeks to identify those frequencies at which growing oscillations are occurring and to compensate for the effect by filtering the signal at those frequencies.

Thus, as hereinbefore described, referring again to FIG. 3, a system comprising two haptic output devices 21, 22 each attached to a personal computer 23,24 which are in turn linked through, say, the internet 5 is susceptible to the network latency problems outlined above.

In use, each computer 23,24 reads the respective position of the haptic output device 21,22 attached thereto and transmits data defining the positional co-ordinates of the handpiece of its haptic display to the other computer which calculates the force required to coerce its respective handpiece of the connected haptic display towards the same co-ordinates. The computer therefore instructs the haptic display to exert that force on the user through the handpiece. The symmetric communication keeps the two displays moving in unison enabling transmission of simple forces, positions, shapes textures and motions to be transmitted between them.

Now in the system of the invention each computer maintains a record of recent positions of its respective haptic display handpiece which, in one method, is subjected to Fourier transformation to provide a spectrum of the frequency components of the motion. By comparing spectra it is then determined whether there are frequencies present at which the amplitude is consistently growing and if such a frequency is found it is suppressed in the calculation of forces to be applied in the movement of the handpiece.

Alternatively, it is possible to determine which frequencies are likely to be growing unstable by determining the round trip latency time of the transmitted data packets. In this case frequencies which are an odd integer divided by twice the round trip latency time are at risk because negative feedback will be converted to positive feedback during the round trip. There is a further factor which needs to be taken in to account this being the natural oscillation frequency of two haptic devices coupled into a system. In this case it is necessary to determine the latency which may not be constant but which can be measured repeatedly, the mechanical and simulated mechanical properties of the haptic devices which are coupled (which can be set in software) and the mechanical response of the users hand which can be measured or estimated from the response of the output device handpiece when known force is applied.

In a still further potential consideration, the computational power required to perform the Fourier Transform comparison may be reduced if the frequencies which are most likely to be at risk of growing in amplitude are determined and only those frequencies at risk need be checked for growing spectral components.

Figure 4:
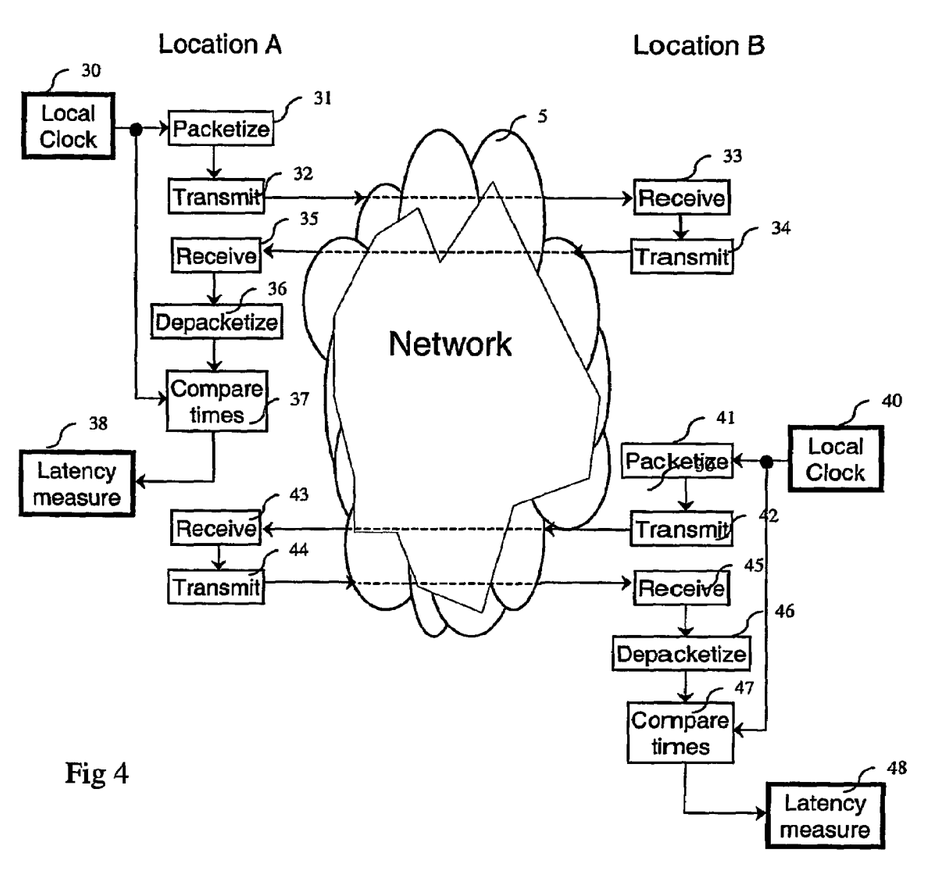
FIG. 4 is a schematic flow chart of the method of measuring latency between two locations to effect adjustment of the system of FIG. 2.

Turning now to FIG. 4, from each of the locations A and B the respective local clocks 30, 40 of the PCs 23,24 is used to determine the network latency. Thus, from location A the time from the local clock is bundled into a transmission packet, step 31, and transmitted at step 32 through the network 5. The packet is received at location B, step 33, and is immediately retransmitted at step 34 through the network 5 and is again received at step 35 at location A the received time stripped out (this being the time at which transmission first occurred) and the received time is compared again at step 37 with the local clock 30 to provide, at step 38, a usable measure of latency of the network 5.

Whilst it would be possible to transmit latency information across the network so that each end used the same latency, in the case of network variations a similar latency measurement may be carried out from location B as indicated using the respective local clock 40 to derive a latency measure by way of steps 41 to 47 corresponding to those of steps 31 to 37.

It will be noted that because only one clock is involved in determining the latency measurement synchronisation of the clocks across the two communicating systems is not required. It will of course be appreciated that the packetisation need not necessarily be of specific clock time but may simply be a serial number which is transmitted and received and a look up table is used to determine the time of transmission of the series number packet for comparison with the current time.

Note that each end may perform a respective latency measurement in case there should be a difference between the latency being experienced across the network due to path variations in forward and reverse transmission paths.

Figure 5:
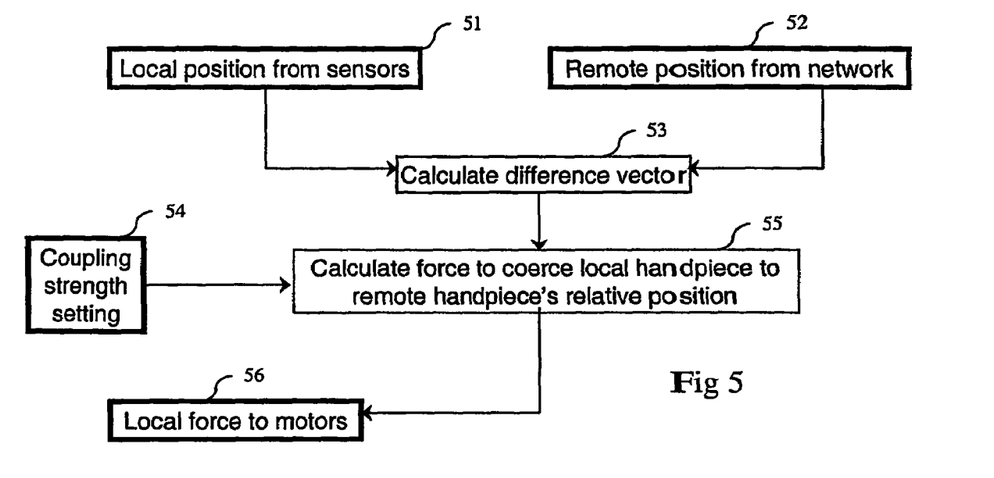
FIG. 5 is a schematic flow chart of the method of calculating forces to be applied locally.

Once the latency in each direction has been determined, two methods of countering the latency problem may be used. In one instance a latency measurement is used to react negatively at the local end to modify the position data for transmission to the opposed end. Considering FIG. 5, in a typical haptic coupling across the network, local positions derived from the haptic output device sensors as indicated at step 51 and the remote position received from the network, step 52, are used to calculate differences and to provide difference vector (step 53) in respect of the x, y and z co-ordinates of the two haptic output devices. The coupling strength or resilience of the coupling between the two devices is then used (step 54) to calculate the force required to coerce the local haptic device to the relative position of the remote device (step 55) so that x, y and z vectors can be transmitted to provide the local force for motors at step 56.

Figure 6:
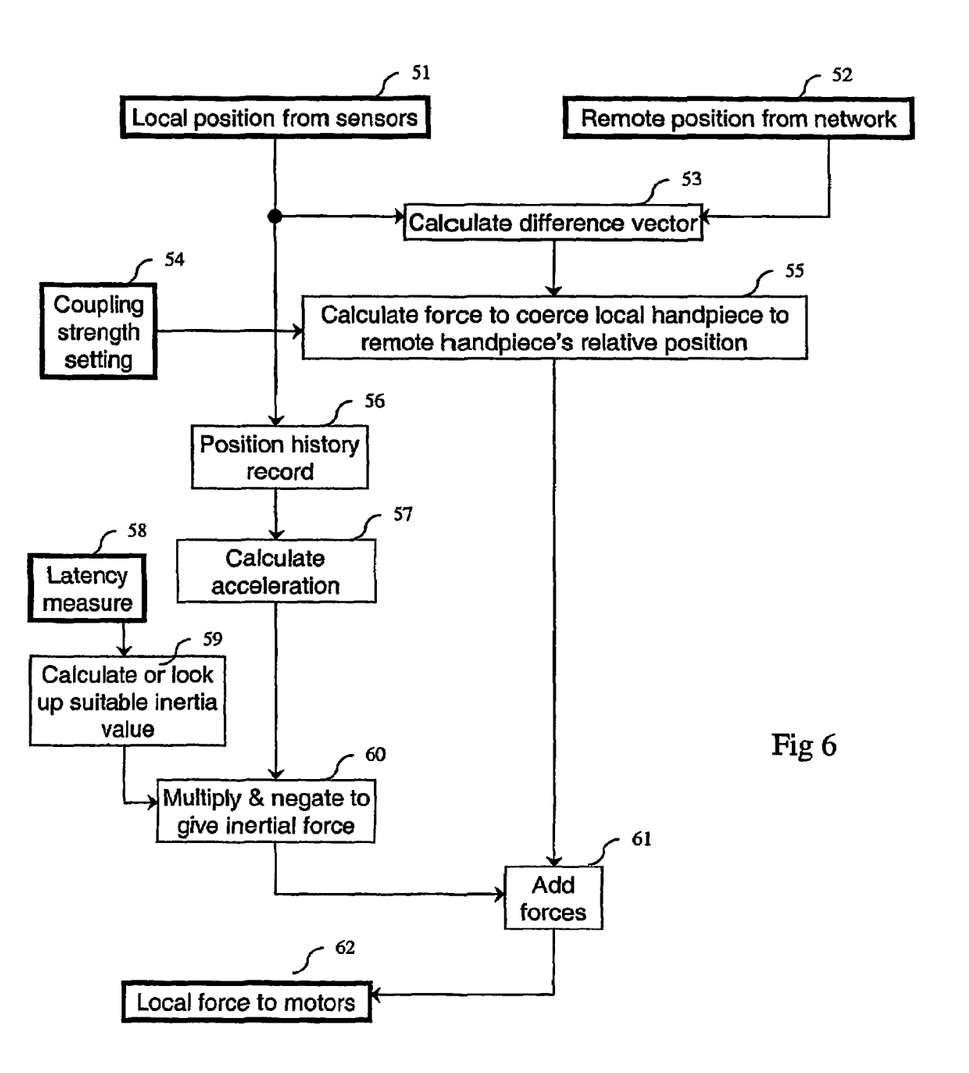
FIG. 6 to 8 are schematic flow charts showing how to put the invention in to practice.

Referring now to FIG. 6, after calculation of the force required to coerce a local hand piece to the remote hand pieces relative position, the position history record determining input movement is used to calculate acceleration, step 57, of the local haptic output device and the previously determined latency measure, step 58, is used to calculate an inertial value to be added in when determining the forces to be applied. In the alternative a look up table may be used to provide a link between a measured latency value and an appropriate inertial value. The acceleration and inertial values can now be used to provide an inertial force characteristic which can be used in combination with the calculated force for coercing the local hand piece to the remote hand piece relative position, step 61, so that the x, y and z forces output to the motors of the local haptics output device are now adjusted to take account of latency or output.

Figure 7:
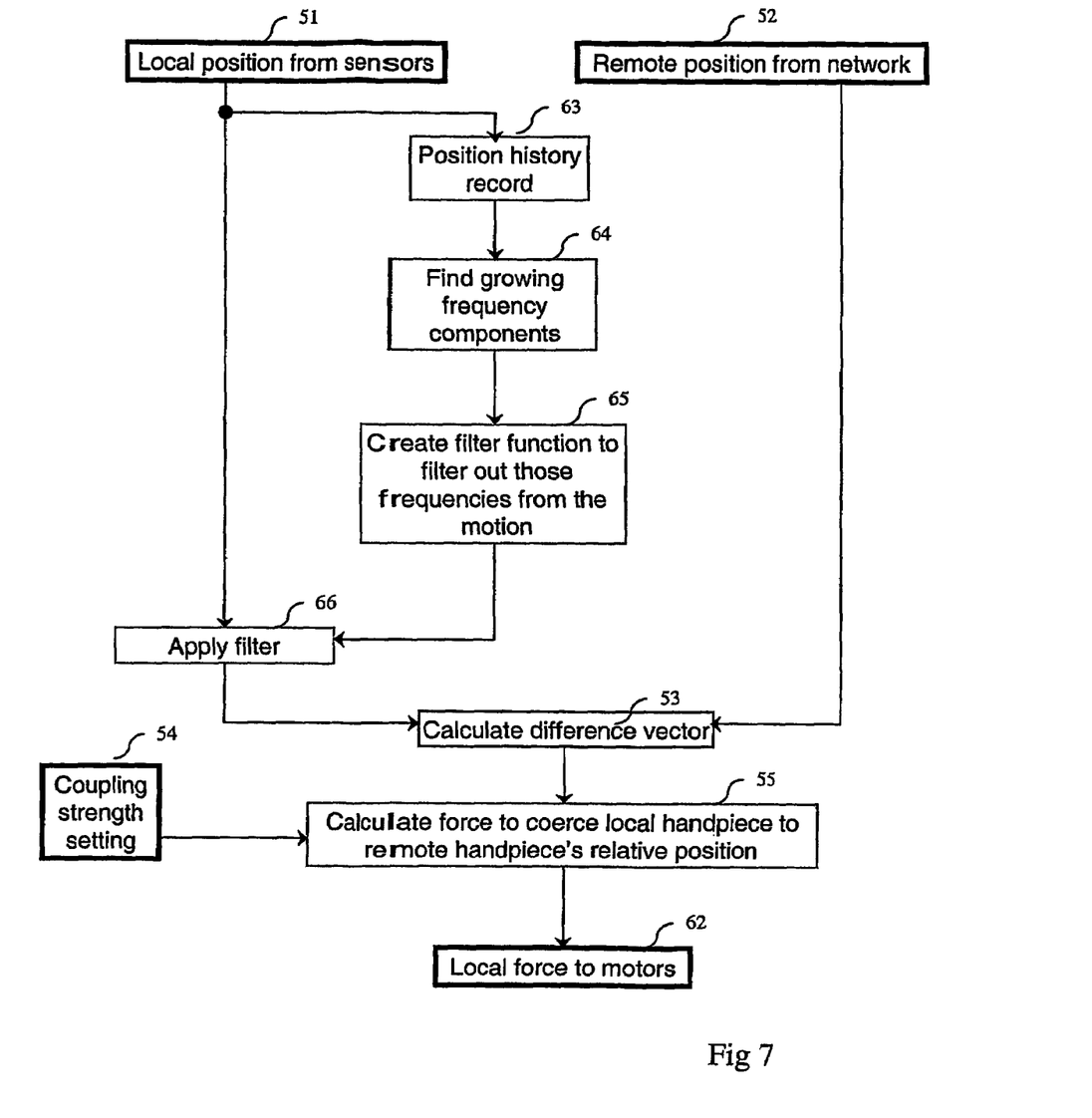

Referring now to FIG. 7, in the invention a further step is introduced in which the local position from the sensors (step 51) is added to a position history record (step 63) and the position history record is then subjected to either Fourier Transformation or to the more limited frequency analysis mentioned above to determine those components which exhibit a growth in amplitude (step 64). A filter function to remove those growing frequency components is then created (step 65) and is applied to the local position data (step 66) prior to using the local position data to calculate the difference vector to be used in calculating the force required to coerce the local handpiece to the relative position of the remote handpiece.

Figure 8:
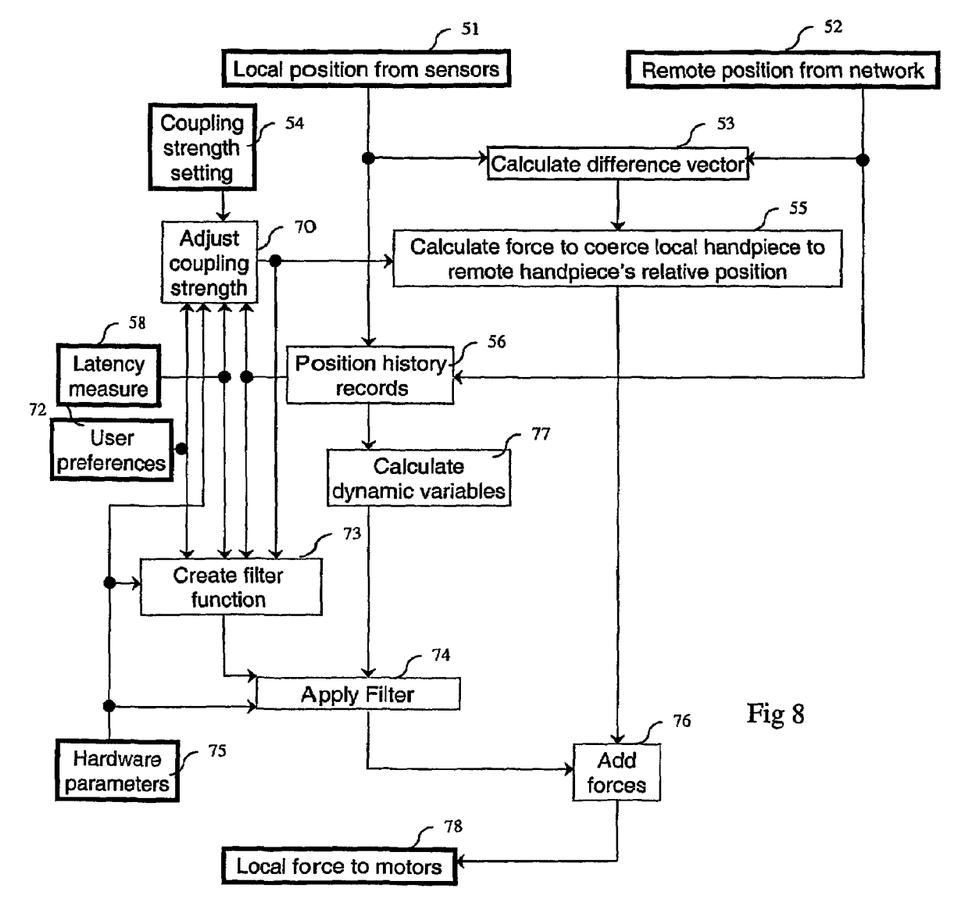

FIG. 8, in a more complex arrangement it is possible to introduce in addition to coupling strengths on latency measurements user preferences. Thus, for example, in calculating the force required to coerce a local hand piece to the relative position of a remote sensor user preferences may affect the coupling strength 54, which can be adjusted (step 70) to take account of the position history and user preferences.

The user preferences 72 may also be used to amend filtering characteristics 73 and dynamic variables 77 including but not limited to acceleration can be calculated as before with filtering 74 being used to take account of local hardware parameters 75 as well as user preferences and latency with all such forces 76 contributing to the adaptation of the output signal data to local force motors 78.

The packets carrying the time information can be the same ones that carry the haptic effector position information. This has the advantage of ensuring the appropriate network stack delays for the position information are included in the measured latency and reduces the number of packets which need to be sent.

There are other physical parameters besides mass which could be adjusted to filter out latency induced instability.

These include viscous drag (force proportional to & opposing velocity) & friction (a force opposing velocity and of constant magnitude if velocity non-zero, otherwise of equal magnitude to & opposing the applied force up to a limit).

Instead of using the parameters related to the physics of the haptic effector, those related to the coupling between the haptic effectors could be used. For example, decreasing the strength with which each effector tries to jump to the position of the other can reduce instability.

The different filtering means mentioned above could be applied in combination as well as individually.

Other methods of haptic transmission (e.g. measuring reaction force from the environment at one effector, transmitting it and outputting it via the other effector) could be used instead of coercing the effector handpieces to each-other's position using a simulated spring force.

Other methods of networking (e.g. ISDN, TCP over IP or RS232 serial over a modem to modem link over PSTN) could be used instead of UDP. Other methods of network latency measurement (e.g. 'ping' time, network performance metrics from other computers on the network, or single direction measurement by synchronised clocks) could be used.

Other forms of adjustable instability suppression could be adjusted in response to latency measurements.

The filtering parameters could be adjusted automatically by means other than latency measurement. For example it could be automatically increased whenever the onset of oscillations indicating instability are detected and gradually decreased when no instability has been detected for a period of time.

The forms of instability filtering described could be used without the automatic adjustment, e.g. the simulated mass kept at a value which predefined or set by the user. Instability is also affected by how a user responds to the effectors motion. In our trials, some users were able to learn to reduce some instability themselves. Such users might therefore prefer less filtration so as to increase speed & detail of feeling at the expense of stability. Therefore it is proposed to include in the calculation of the degree of correction a parameter which the user has some control over.

Alternatively the system could adapt the degree of filtering to fit the user automatically (e.g. by decreasing the filtering until the start of oscillations indicating instability are detected).

The per-user parameters, whether manually or automatically set, could be stored for future use.

The adjustments made to the position parameters can be combined with other senses. Most obviously is a visual representation of a haptic scene but also with sound, smell and other perceptive stimuli.

The invention claimed is:

1. A method of activating a haptic output device of the kind responsive to signals defining directional force comprising receiving a series of signals defining a multiplicity of data packets, each packet defining a directional force applied at one location for transmission to the current location, determining from packet data the information defining a position to which a haptic output device is expected to move, using current positional data to generate output signals defining force and direction, applying a damping factor to said force and direction signals to slow the rate of movement from a previously defined position towards the current defined position, storing data defining each of a multiplicity of positions to which the haptic output device has moved, analysing said data to determine frequency components in the movement which are increasing, creating a filter function to remove said increasing frequency components and applying said filter function to said force and direction signals to eliminate said frequency components from movement effected by the haptic output device.

2. The method of claim 1 further including signaling in each direction whereby haptic forces applied at one device in reaction to an applied force towards the current defined position are reflected to a corresponding device in the form of current positional signals in a series of return data packets.

3. A method of activating a haptic output device of the kind responsive to signals defining directional force comprising receiving a series of signals defining a multiplicity of data packets, each packet defining a directional force applied at one location for transmission to the current location, determining from packet data the information defining a position to which a haptic output device is expected to move, using current positional data to generate output signals defining force and direction, applying a damping factor to said force and direction signals to slow the rate of movement from a previously defined position towards the current defined position, storing data defining each of a multiplicity of positions to which the haptic output device has moved, analysing said data to determine frequency components in the movement which are increasing, creating a filter function to remove said increasing frequency components, calculating the filter function from determined parameters of a transmission network on which said data packets are carried and applying said filter function to said force and direction signals to eliminate said frequency components from movement effected by the haptic output device.

4. The method of claim 3 in which latency of the network is determined by transmitting a data packet to the network said packet including a time determinant identity, reflecting the data packet through the network and comparing the received time with the transmitted time to provide a latency parameter from which said filtering function is determined.

5. The method of claim 4 in which at least some transmitted packets carrying positional data also include the time determinant data, some of said time determinant data being returned to permit updating of the latency parameter.

6. The method of claim 1 further including applying a modifying factor to the force and direction signals, said modifying factor being derived from pre determined user preference data.

7. An interactive haptic output terminal which communicates with a bi-directional transmission arrangement, the terminal comprising at least a haptic output device and controller, said controller receiving signals from said haptic output device to determine a current position for said device, and to determine from signals received from said transmission arrangement a preferred current position for said haptic output device, said controller determining an output force and direction required to move said haptic output device from the current position to the preferred position, modifying said output force and direction by storing data defining each of a multiplicity of positions to which the haptic output device has moved, analysing said data to determine frequency components in the movement which are increasing, creating a filter function to remove said increasing frequency components and applying said filter function to said force and direction signals to eliminate said frequency components from movement effected by the haptic output device.

8. A terminal as claimed in claim 7 in which the controller receives signals from the haptic output device, said signals containing data defining the position of said device at any particular time, said controller converting said data to signals for transmission to said bi-directional transmission arrangement at predetermined intervals.

9. A terminal as claimed in claim 7 in which the signals defining a preferred current position are generated by an environment simulator, for example a programmed computer.

10. A terminal as claimed in claim 7 in which the signals defining a preferred current position are generated by a corresponding interactive output terminal at the opposed end of the transmission arrangement.

11. The method of claim 1, wherein the series of signals defining the multiplicity of data packets is received over a connectionless network.

12. The method of claim 1, wherein analysing said data to determine frequency components includes performing a Fourier transformation of said data.

13. An interactive haptic output terminal which is capable of communicating with a bi-directional transmission arrangement, the terminal comprising:

at least a haptic output device, and a controller, said controller receiving signals from said haptic output device to determine a current position for said device, and to determine from signals received from said transmission arrangement a preferred current position for said haptic output device, said controller determining an output force and direction required to move said haptic output device from the current position to the preferred position, modifying said output force and direction by storing data defining each of a multiplicity of positions to which the haptic output device has moved, analyzing said data to determine frequency components in the movement which are increasing, creating a filter function to remove said increasing frequency components and applying said filter function to said force and direction signals to eliminate said frequency components from movement effected by the haptic output device, wherein the filter function is calculated from determined parameters of a transmission network on which said data packets are carried.

14. The terminal of claim 13, in which latency of the network is determined by transmitting a data packet to the network said packet including a time determinant identity, reflecting the data packet through the network and comparing the received time with the transmitted time to provide a latency parameter from which said filtering function is determined.

15. The terminal of claim 14, in which at least some transmitted packets carrying positional data also include the time determinant data, some of said time determinant data being returned to permit updating of the latency parameter.

16. The terminal of claim 7, wherein the signals received from said transmission arrangement include signals received from a connectionless network.

17. The terminal of claim 7, wherein the controller analyzes said data to determine frequency components by performing a Fourier transformation of said data.

* * * * *